April 1, 1924.  G. B. HEATHERINGTON  1,489,123
ANTISKID CHAIN TIGHTENER
Filed March 6, 1923
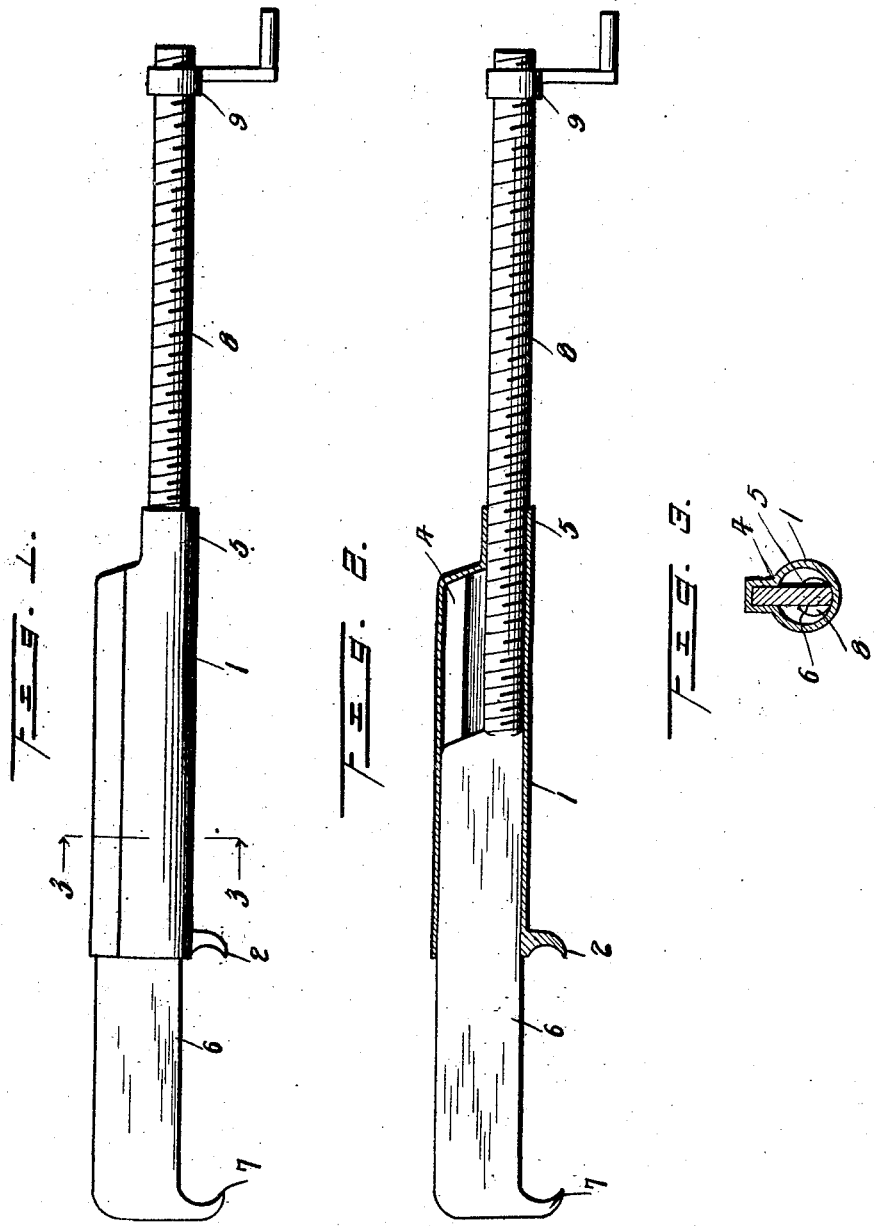
Inventor
G. B. Heatherington Patented Apr. 1, 1924.

1,489,123

UNITED STATES PATENT OFFICE.

GEORGE B. HEATHERINGTON, OF OAKLAND, IOWA.

ANTISKID-CHAIN TIGHTENER.

Application filed March 6, 1923. Serial No. 623,224.

*To all whom it may concern:*

Be it known that I, GEORGE B. HEATHERINGTON, a citizen of the United States, residing at Oakland, in the county of Pottawattamie and State of Iowa, have invented certain new and useful Improvements in Antiskid-Chain Tighteners; and I do hereby declare the following to be a full, clear, and exact description of the invention, such as will enable others skilled in the art to which it appertains to make and use the same.

The invention has for its object the provision of means whereby anti-skid chains, when applied to the wheel of a motor vehicle, may be tightened to facilitate the adjustment both when applying and removing the chains, thereby preventing the loosening of the chains when in service and obviating the annoyance incident to a loose chain striking the fender or other part of the vehicle.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming part of the application,

Figure 1 is a side view of an anti-skid chain tightener embodying the invention, Figure 2 is a longitudinal section thereof, and Figure 3 a cross section on the line 3—3 of Figure 1.

Corresponding and like parts are referred to in the following description and designated in the several views of the drawings by like reference characters.

The device comprises a tubular member 1 having a spur 2 at one end and a longitudinal enlargement at one side in which is formed a groove 4 which opens into the space of the member. The opposite end of the member 1 is reduced, as indicated at 5. The member 1 may be cast or formed in any preferred way.

A companion member 6 of flattened form is slidable longitudinally within the member 1 and the groove 4 of the lateral extension 2. A spur 7 is provided at one end of the member 6 and is adapted to cooperate with the spur 2 to engage opposite end portions of the chains to be tightened, which are drawn together by advancement of the member 6 within the member 1. A threaded stem 8 projects longitudinally from the opposite end of the member 6 and is adapted to pass loosely through the reduced end 5 of the member 1. A hand nut 9 threaded upon the stem 8 engages the reduced end 5 of the member 1 and serves to draw the member 6 within the member 1 when the tool is in operation to tighten an anti-skid chain about a wheel of a motor vehicle. The member 6 may be cast or formed in any preferred way.

The tool is adapted as an adjunct to the kit of tools usually provided for a motor vehicle and when it is required to tighten an anti-skid chain about the wheel, the spurs 2 and 7 engage links at opposite ends of the chain in the rear of the terminal links or fastening elements, and when the member 6 is drawn within the member 1, the spurs 2 and 7 are drawn together and correspondingly draw opposite end positions of the chain and tighten the same about the wheel, thereby facilitating both the application and the removal of the antiskid chains as required.

What is claimed is:

A device of the class described consisting of a tube-like member made in a single piece, a bar-like member made in a single piece, each member having a spur, the second member having a flat portion for part of its length and a reduced screw threaded shank extending from the flat portion, the first member having a longitudinally offset enlargement providing a groove receiving the flat portion beyond the shank, the first member having a tubular reduced portion disaligned with and beyond the enlargement snugly fit by said shank, the end of the enlargement adjacent said reduced portion being closed, and a nut operable on said shank and against said reduced portion.

In testimony whereof I affix my signature in presence of two witnesses.

GEORGE B. HEATHERINGTON.

Witnesses:
A. C. VANDRUFF,
E. E. FREEMAN.